United States Patent Office
3,767,712
Patented Oct. 23, 1973

3,767,712
DUST-FREE POLYOLS
John H. Daniel, Jr., Willoughby, Ohio, assignor to Commercial Solvents Corporation, New York, N.Y.
No Drawing. Original application Dec. 17, 1969, Ser. No. 885,953, now Patent No. 3,658,919. Divided and this application Dec. 6, 1971, Ser. No. 205,317
Int. Cl. C07c 41/12, 43/04
U.S. Cl. 260—615 R          7 Claims

ABSTRACT OF THE DISCLOSURE

A process for preparing dust-free dipentaerythritol, tripentaerythritol and higher molecular weight polypentaerythritols, or mixtures thereof, by precipitating them in the presence of carboxy polymethylene.

This is a division of application Ser. No. 885,953, filed Dec. 17, 1969, now Pat. No. 3,658,919.

BACKGROUND OF THE INVENTION

This invention relates to an improved method for the production of polyols. In a particular aspect, this invention relates to an improved process for the manufacture of dust-free di-, tri- and higher molecular weight polypentaerythritols.

The condensation of acetaldehyde and formaldehyde in the presence of an alkaline catalyst has long been used for the manufacture of pentaerythritol. Di-, tri- and higher molecular weight polypentaerythritols, hereinafter referred to as polyols, are obtained as by-products of this reaction. These products have important commercial applications, e.g. especially for resin synthesis. When desired they can be isolated in relatively pure form and many methods for so doing are known in the art. Most methods depend on the use of repeated precipitations—or crystallizations—from aqueous media. However, these polyols usually precipitate in finely-divided form, usually crystalline, and these fine crystals present problems in the separating step, e.g. filtering, and in drying. In subsequent manufacturing steps, the fine crystals create an objectional amount of dust when the polyols are charged into reaction vessels for the manufacture of derivatives, e.g. resins. Accordingly, a need has long existed for a method of obtaining polyols in larger particle size than previously available.

SUMMARY OF THE INVENTION

It is an object of this invention to provide an improved method for the production of polyols.

It is another object of this invention to provide a method for the production of dust-free di-, tri- and higher molecular weight polypentaerythritols.

Other objects of this invention will be apparent to those skilled in the art from the disclosure herein.

A method has been discovered for the production of dust-free polyols, including mixtures thereof, by precipitating the polyol in the presence of a water-soluble polymer selected from the group consisting of methyl cellulose and carboxy polymethylene; when the latter is used, the precipitation is effected at a pH below about 8.0. The precipitated material is then separated, washed and dried in accordance with known methods.

DETAILED DISCUSSION

The process of the present invention is useful in conjunction with any of the known processes, the improvement residing in effecting the precipitation of di-, tri- and higher molecular weight pentaerythritols, collectively known as polyols, in the presence of methyl cellulose or carboxy polymethylene in a concentration of from about 0.001% to about 1.0% based on the amount of the polyol.

The polyols which are benefitted by the process of the present invention can be represented by the formula:

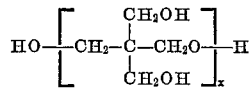

where $x$ is an integer of 2 or higher. The upper limit of $x$ has not been determined, and it is not intended that the invention be limited to any particular range of $x$. Generally, however, $x$ is in the range of from 2 to 5 and only a small proportion of polyols is represented by the formula where $x$ is greater than 5. The polyol must be dissolvable in water or in mixtures of water and a water-miscible solvent, as set forth below, although the solutions may be relatively dilute even at elevated temperatures.

It will be apparent to those skilled in the art that the invention can be beneficially applied to semi-refined or refined products simply by redissolving the polyol in a suitable solvent and re-precipitating it in the presence of methyl cellulose or carboxy polymethylene. Generally, however, the present invention will be employed during the steps of separating the products of the condensation reaction.

During the condensation reaction, or upon subsequent cooling, a crude material consisting of tripentaerythritol and higher molecular weight polyols precipitates from the reaction mixture. This crude material is separated by any suitable means, e.g. by filtration, centrifugation or decantation and is further refined as set forth below. The mother liquor contains the mono- and di-pentaerythritols which are separated by subsequent processing steps, during which steps crude dipentaerythritol is separated by crystallization. This crude dipentaerythritol, from which purer dipentaerythritol is obtained, may contain up to 50% and under some circumstances higher amounts of monopentaerythritol. Customarily it is re-dissolved, usually in water, at an elevated temperature, treated with activated carbon to remove color bodies, and cooled to re-precipitate relatively pure dipentaerythritol. These processing steps are well known to those skilled in the art.

According to the present invention, the step of re-precipitating dipentaerythritol is effected in the presence of methyl cellulose or carboxyl polymethylene dispersed in the solution in an amount sufficient to provide a concentration of from about 0.001% to about 1.0% based on the amount of the polyol, preferably within about 0.0025% to 0.5%, and a range of 0.03% to 0.30% is particularly preferred and about 0.15% is especially preferred. When carboxy polymethylene is used as the water-soluble polymer, the pH is adjusted to below about 8.0, if necessary. After cooling, the precipitate is separated, preferably by filtration or centrifugation, washed and dried.

The dipentaerythritol obtained thereby is in the form of small spheres, surprisingly uniform in size, and relatively coarse compared with the product otherwise obtained. The improved product is more easily separated from the mother liquor than the product of the previous process and is more easily washed. When dry, it is free from problems of dusting during handling. The bulk density is also advantageously higher compared with the product of the prior process.

The crude polypentaerythritol, mentioned above, which was separated from the reaction mixture after the condensation reaction was complete, contains tripentaerythritol as the major component, but tetra-, penta- and still higher homologs are also present. The crude material can be conveniently purified by any suitable procedure, many of which are known. One suitable procedure is to slurry it in its own mother liquor or in fresh water, boiling to dissolve solubles, filtering to remove the insoluble portion which is rich in the higher polyols and cooling the filtrate in the presence of the water-soluble polymer as hereinbefore set forth to obtain a coarse, easily managed precipitate consisting primarily of tripentaerythritol. When desired, the insoluble portion is again slurried in water, heated to dissolve the remaining polyols and filtered. The water-soluble polymer is added as hereinbefore set forth and the solution cooled to precipitate the polyols.

In the absence of the water-soluble polymer, the tripentaerythritol together with smaller amounts of higher polyols precipitate in an extremely finely-divided form which is difficult to separate from the liquid medium. The presence of the water-soluble polymer causes the formation of a coarse precipitate which presents no problems in separation, especially filtration.

The present invention has been discussed principally as it relates to the precipitation of polyols from aqueous solution. It is also known to precipitate polyols from solutions obtained by dissolving the polyols in mixtures of water and water-miscible solvents. The process of the present invention is equally effective when used in conjunction therewith and it is understood that the invention is not limited to the use of strictly aqueous systems.

In the practice of this invention, the water-soluble polymer is preferably dispersed in water or, when preferred, in mixtures of water and a water-miscible solvent, as is known in the art. Suitable water-miscible solvents include the lower aliphatic alcohols, that is the lower alkanols e.g. those having from 1-3 carbon atoms. The dispersed polymer is added to the warm polyol solution with agitation to insure thorough mixing. When the solution is to be filtered before cooling, the polymer solution can be added either prior to or after filtration. Generally it is preferred to add it after filtration. The mixture thereby obtained is then chilled to effect precipitation of the polyol, as is known in the art, and the precipitate is separated by any suitable means, e.g. by decantation, centrifugation or filtration, then washed and dried.

It was particularly surprising to find that effecting the precipitation in the presence of either of the two polymer types would result in increased particle size. Water-soluble polymers often behave as protective colloids and the usual tendency of protective colloids is to minimize crystal size. In fact numerous similar polymeric compounds have been tested and found to be less effective than those of the present invention or, more often, entirely ineffective.

Although the invention is very useful during the purification of crude dipentaerythritol or crude polypentaerythritol, its application is not restricted to these situations. Purified di- or tripentaerythritol or mixtures thereof with each other, either in the presence or absence of monopentaerythritol, can be crystallized according to the process of this invention to obtain the larger particle size and higher bulk density, essentially free from dusty material.

The carboxy polymethylene useful in the practice of this invention is an extremely high molecular weight cross-linked polymer of acrylic acids. It is also known as a carboxy-vinyl polymer. Materials suitable for the practice of this invention, but not necessarily limited thereto, are sold under the trademark Carbopol, by B. F. Goodrich Chemical Company, Clevelend, Ohio. Carbopol is supplied in the free acid form under the code numbers 934, 940 and 941, and each has an equivalent weight of 75. All of them are suitable for the practice of this invention but the 934 resin is preferred. The performance of carboxy polymethylene is dependent upon the degree of neutralization. In general, a pH below 5.0 leads to the development of a preponderance of coarsely crystalline material, while at a pH of 8.0 or above a finely-divided product is formed that differs little in its screen analysis from the control where no water-soluble polymer was used.

Accordingly, when carboxy polymethylene is employed, the pH is adjusted, if necessary, to within about 3 to about 8, e.g. with an acid, as necessary. A pH within the range of from about 3.0 to about 6.0 is preferred and from about 3.0 to about 5.0 is particularly preferred. Any organic or inorganic acid capable of adjusting the pH to the desired range can be used for the pH adjustment. Suitable acids include, but are not limited to, hydrochloric, sulfuric, nitric, phosphoric, formic, acetic, propionic, oxalic, etc. If the pH is below about 3, an alkaline material is preferably added as necessary. Suitable alkaline materials include, but are not limited to, ammonia, sodium or potassium hydroxide, sodium or potassium carbonates or bicarbonates, water-soluble amines, etc. The step of adjusting pH is well known in the art and any suitable reagent can be employed in the practice of this invention.

Methyl cellulose is a well-known cellulose ether that is manufactured commercially in a number of degrees of substitution of the ether group. Certain of these types, particularly those having a degree of substitution of 1.3 to 2.5 are soluble in cold water and to varying degrees also soluble in warmer water. Methyl cellulose is described in, for example, Kirk-Othmer "Encyclopedia of Chemical Technology," 2nd ed. (1964), vol. 4, pp. 648–650. It is not intended that the invention be limited to the grades that contain only the methyl substituent. Other grades that contain minor amounts of hydroxypropoxyl and hydroxybutoxyl substitution in addition to the methyl groups can also be used. All of these substituted celluloses are effective in reducing the amount of fine, dusty material in the crystal structure of the higher molecular weight polyols of pentaerythritol as herein described. A suitable product is sold under the trademark "Methocel" by The Dow Chemical Company, Midland, Mich. It is not necessary to adjust the pH when methyl cellulose is employed as the polymer.

The invention will be understood more fully by reference to the following specific examples. It is understood, however, that the examples are presented for purposes of illustration only and it is not intended that the invention be limited thereby.

EXAMPLES 1 AND 2

Three samples of crude dipentaerythritol, 100 g. each, containing 7.5% by wt. monopentaerythritol, were dissolved in boiling water to give approximately 10% by wt. solutions. Activated carbon, 4 g. ("Nuchar" manufactured by West Virginia Pulp and Paper Company), was added to each and the boiling was continued for 30 minutes. Each mixture was filtered hot, then a solution of 0.03 g. of methyl cellulose (Methocel 65 HG Standard manufactured by The Dow Chemical Company) dissolved in 20 ml. water was added to one (Example 1) with stirring, and 0.15 g. in 20 ml. water was added to the second (Example 2); the third received no additive and served as a control. Each mixture was again boiled for ten minutes, allowed to cool slowly while maintaining slow agitation until they reached room temperature, during which time a precipitate developed in each sample.

The crystalline precipitate was separated from each sample by filtration, washed with cold water and dried.

By the use of photomicrographs, it was determined that the particles in the first sample were spherical, remarkably uniform in size having diameters about 0.3–0.5 mm., and the product was free from dust. The particles from the second example were coarse, remarkably-uniform spheres having a diameter in the range of 0.5–1.0 mm. The product was free from dust. The product from the third sample, the control, was not spherical but was irregular in shape and very finely divided. An appreciable amount of it was dusty material. The particle size distribution was determined by sieve analysis. The screen sizes and bulk densities of the products of Examples 1, 2 and the control are shown in the following table:

TABLE 1.—EFFECT OF METHYL CELLULOSE ON PARTICLE SIZE

|  | Control | Ex. 1 | Ex. 2 |
| --- | --- | --- | --- |
| Methyl cellulose, percent | 0.0 | 0.03 | 0.15 |
| Bulk density, percent | 0.56 | 0.74 | 0.79 |
| Retained on screen, percent: |  |  |  |
| 30 mesh | 0 | 1.4 | 29.0 |
| 50 mesh | 0.7 | 87.2 | 68.7 |
| 80 mesh | 0.9 | 10.1 | 1.2 |
| Through 80 mesh | 98.4 | 1.3 | 1.1 |

The spherical particles obtained in Examples 1 and 2 were found to be resistant to fracture. No appreciable change in screen analysis was noted after shaking small amounts of the products in a 2-ounce jar for 52 hours on a laboratory shaker.

EXAMPLE 3

Crude dipentaerythritol, 100 g., having 4.96% monopentaerythritol content, was dissolved in boiling water to give a 10% solution. Activated carbon (Nuchar), 4 g., was added to remove color bodies and the mixture was boiled for 30 minutes, then filtered while still hot. A dilute aqueous solution of 0.01 g. (0.01% by wt. based on the crude dipentaerythritol) of carboxy polymethylene (Carbopol-934) was added, followed by 1 ml. of a 0.5% solution of $NH_3$ in water. The pH of the resultant mixture was 4.6. The solution was cooled slowly with stirring to room temperature during which time the product precipitated. The coarse product was separated by filtration, then washed with cold water and dried. The particle size distribution, determined by screening, is given in Table 2.

The foregoing experiment was repeated in all essential details except that 0.03% by wt. Carbopol-934 was used and the pH was adjusted to 8.1 with ammonia. Only very fine crystals were produced as shown by the following screen test results:

TABLE 2.—EFFECT OF CARBOXY POLYMETHYLENE ON PARTICLE SIZE

| Carbopol-934, percent | 0.01 | 0.03 |
| --- | --- | --- |
| pH | 4.6 | 8.1 |
| Retained on, percent by weight: |  |  |
| 30 mesh | 21 | 0 |
| 50 mesh | 59 | 5 |
| 80 mesh | 8 | 10 |
| Through 80 mesh | 12 | 85 |

EXAMPLE 4

The experiment of Example 1 was repeated in all essential details except that a solution of 10% by vol. of ethyl alcohol in water was employed as the solvent, and the crude dipentaerythritol had a monopentaerythritol content of 13.90%. A coarse, essentially-spherical product was obtained as disclosed by examination under a microscope. The screen analysis is given in Table 3.

EXAMPLE 5

A mixture of purified pentaerythritol, 50 g., and purified dipentaerythritol, 50 g., was slurried in sufficient water to give a 10% solution, then heated to boiling to completely dissolve the solids. To the hot solution was added 0.03 g. of methyl cellulose and the solution was allowed to cool slowly with stirring. Dipentaerythritol separated in the temperature range between 23° and 15° C. It was separated by filtration and dried, yielding 46 g. of product essentially free from dusty material.

The above procedure was simultaneously repeated in all essential details except that the methyl cellulose was omitted. The particle size distribution determined by screen analysis is shown in the table below:

TABLE 3

|  | Ex. 4 | Ex. 5 |  |
| --- | --- | --- | --- |
| Methyl cellulose, percent | 0.03 | 0.0 | 0.03 |
| Retained on: |  |  |  |
| 30 mesh | 1.4 |  |  |
| 50 mesh | 24.1 |  |  |
| 80 mesh | 57.5 | 75.3 | 72.1 |
| Through 80 mesh | 17.0 | 24.7 | 27.9 |
| Retained on: |  |  |  |
| 140 mesh |  | 12.3 | 26.2 |
| 200 mesh |  | 8.8 | 1.1 |
| 325 mesh |  | 2.9 | 0.6 |
| Through 325 mesh |  | 0.7 | 0.0 |

EXAMPLE 6

Crude polypentaerythritol consisting of major proportions of tripentaerythritol and minor amounts of the higher homologs, tetrapentaerythritol, pentapentaerythritol, etc., was obtained by separation from a pentaerythritol reaction liquor prepared as follows.

There was transferred to an open reaction vessel equipped with an agitation means and a temperature controlling means, 26,670 parts of 33.6% by wt. formaldehyde solution. It was further diluted by adding 36,940 parts of water. Sodium hydroxide (5,800 parts of 50% aqueous solution) and acetaldehyde (2,905 parts of 99% purity) were gradually and concurrently added to the dilute formaldehyde solution at a uniform rate such that the caustic was added over an interval of 67 minutes and the acetaldehyde over an interval of 90 minutes. The total charge was then transferred to a second similar vessel where the reaction was continued by stirring for an additional five and one-half hours. Twenty-five hundred parts of water was used to rinse the first reactor and was added to the reaction mixture in the second vessel. Maximum temperature during the feed cycle was 45° C., and during the reaction in the second vessel it was 35° C.

At the end of the reaction period, a portion, 2,550 parts, of the mixture was withdrawn. It contained insoluble polypentaerythritols in a finely-divided form. The solution was allowed to stand to permit the solids to settle and the clear liquor was removed by decantation, leaving a residue of 650 parts of the slurry. The residue was heated to boiling to dissolve most of the precipitate and filtered while still hot with the assistance of a filter aid. The filtrate was cooled to 80° C. and 0.009 part by weight of methyl cellulose (Methocel) was added, followed by gradual cooling to 35° C. The polypentaerythritols separated as coarse agglomerated particles that filtered readily.

The foregoing experiment was repeated in all essential details except that the methyl cellulose was omitted. Only a very fine product separated from the cooled solution; this was difficult to filter and upon drying yielded a dusty product.

EXAMPLE 7

The experiment of Example 1 is repeated except that approximately 1.0% of methyl cellulose is substituted for 0.03% of same. A coarse precipitate, readily filterable and dust-free when dried, is obtained.

What is claimed is:

1. In a process for the production of a substantially dust-free polyol represented by the formula:

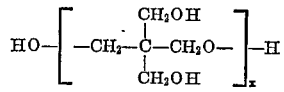

where x is an integer of 2 or higher by precipitation from about a 10% by weight solution in water, or in an aqueous lower alkanol solvent containing it, by cooling said solution thereby precipitating said polyol the improvement comprising precipitating said polyol in the presence of carboxy polymethylene in an amount of from about 0.001% to about 1.0% based on the weight of said polyol thereby producing said substantially dust-free polyol having enlarged particle size.

2. The process of claim 1 wherein said carboxy polymethylene is employed in an amount of from about 0.0025% to about 0.5% based on the weight of said polyol.

3. The process of claim 2 wherein the pH is in the range of about 3 to about 8.

4. The process of claim 3 wherein the carboxy polymethylene is present in an amount of from about 0.03% to about 0.30% based on the weight of said polyol and the pH is within the range of from about 3.0 to about 5.0.

5. The process of claim 4 wherein said carboxy polymethylene is present in an amount of about 0.15% based on the weight of the polyol.

6. The process of claim 1 wherein said polyol is dipentaerythritol.

7. The process of claim 1 wherein said polyol is tripentaerythritol.

References Cited
UNITED STATES PATENTS

| | | | |
|---|---|---|---|
| 2,288,929 | 7/1942 | Wyler | 260—615 R |
| 2,420,497 | 5/1947 | Poitras et al. | 260—615 R |
| 2,745,880 | 5/1956 | Russel et al. | 260—615 R |
| 2,749,370 | 6/1956 | Brendlein et al. | 260—615 R |

FOREIGN PATENTS

| | | | |
|---|---|---|---|
| 21,358 | 10/1963 | Japan | 260—615 R |
| 27,562 | 11/1969 | Japan | 260—615 R |

HOWARD T. MARS, Primary Examiner

PO-1050
(5/69)

UNITED STATES PATENT OFFICE
CERTIFICATE OF CORRECTION

Patent No. 3,767,712  Dated October 23, 1973

Inventor(s) John H. Daniel, Jr.

It is certified that error appears in the above-identified patent and that said Letters Patent are hereby corrected as shown below:

Column 2, line 52, "carboxyl" should be --carboxy--

Signed and sealed this 18th day of June 1974.

(SEAL)
Attest:

EDWARD M. FLETCHER, JR.
Attesting Officer

C. MARSHALL DANN
Commissioner of Patent